(12) United States Patent
Yang et al.

(10) Patent No.: US 12,494,550 B2
(45) Date of Patent: Dec. 9, 2025

(54) BATTERY PACK HAVING CONNECTION PLATES, ELECTRONIC DEVICE, AND VEHICLE

(71) Applicant: LG Energy Solution, Ltd., Seoul (KR)

(72) Inventors: Jin-Oh Yang, Daejeon (KR);
Kwang-Bae Lee, Daejeon (KR);
Jae-Yong Hur, Daejeon (KR);
Young-Su Son, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 671 days.

(21) Appl. No.: 17/769,923

(22) PCT Filed: Jan. 7, 2021

(86) PCT No.: PCT/KR2021/000170
§ 371 (c)(1),
(2) Date: Apr. 18, 2022

(87) PCT Pub. No.: WO2021/141397
PCT Pub. Date: Jul. 15, 2021

(65) Prior Publication Data
US 2022/0393308 A1 Dec. 8, 2022

(30) Foreign Application Priority Data
Jan. 8, 2020 (KR) .................. 10-2020-0002620

(51) Int. Cl.
*H01M 50/503* (2021.01)
*H01M 50/213* (2021.01)
(Continued)

(52) U.S. Cl.
CPC ....... *H01M 50/503* (2021.01); *H01M 50/213* (2021.01); *H01M 50/218* (2021.01);
(Continued)

(58) Field of Classification Search
CPC ............ H01M 50/503; H01M 50/213; H01M 2220/20; H01M 2220/30
See application file for complete search history.

(56) References Cited

U.S. PATENT DOCUMENTS

| 2005/0079408 A1 | 4/2005 | Hirano |
| 2011/0287287 A1 | 11/2011 | Kang |

(Continued)

FOREIGN PATENT DOCUMENTS

| CN | 1592977 A | 3/2005 |
| CN | 111406329 A | 7/2020 |

(Continued)

OTHER PUBLICATIONS

Machine Translation—KR 20180117033 A (Year: 2018).*
(Continued)

*Primary Examiner* — Ula C Ruddock
*Assistant Examiner* — Christina Renee Daulton
(74) *Attorney, Agent, or Firm* — Morgan, Lewis & Bockius LLP

(57) ABSTRACT

A battery pack includes battery modules each including secondary batteries; a connection plate having a body portion at the upper portion or the lower portion of the secondary batteries and provided with connection terminals respectively in electrical contact and connection with the electrode terminal at one of the secondary batteries, and a connection portion to protrusively extend in a left or right direction from the body portion so that a part of the protrusively extending portion is bent upward or downward from the body portion and the bent end is bonded to a portion of the other connection plate; and a module housing having hollows in which the secondary batteries are inserted and accommodated, the module housing having a separating groove at an outer wall thereof by indenting a portion of the outer wall (Continued)

inward to be spaced apart from the bent end of the connection portion.

10 Claims, 12 Drawing Sheets

(51) Int. Cl.
    *H01M 50/218*     (2021.01)
    *H01M 50/244*     (2021.01)
    *H01M 50/258*     (2021.01)
    *H01M 50/516*     (2021.01)
    *H01M 50/289*     (2021.01)

(52) U.S. Cl.
    CPC ....... *H01M 50/244* (2021.01); *H01M 50/258* (2021.01); *H01M 50/516* (2021.01); *H01M 50/289* (2021.01); *H01M 2220/20* (2013.01); *H01M 2220/30* (2013.01); *Y02E 60/10* (2013.01)

(56) References Cited

U.S. PATENT DOCUMENTS

| | | |
|---|---|---|
| 2011/0293986 A1 | 12/2011 | Kozu |
| 2013/0230761 A1 | 9/2013 | Okutani et al. |
| 2016/0028059 A1 | 1/2016 | Sweney et al. |
| 2018/0138475 A1 | 5/2018 | Seo et al. |
| 2018/0138564 A1* | 5/2018 | Kim ................. H01M 50/55 |
| 2018/0233723 A1* | 8/2018 | Morioka ........... H01M 50/271 |
| 2019/0214694 A1 | 7/2019 | Yang et al. |
| 2019/0237736 A1* | 8/2019 | Watanabe ........... H01M 10/482 |
| 2019/0372069 A1 | 12/2019 | Lee et al. |
| 2020/0014006 A1 | 1/2020 | Oliveira et al. |
| 2020/0044227 A1 | 2/2020 | Ryu et al. |
| 2020/0295337 A1 | 9/2020 | You et al. |
| 2021/0083254 A1 | 3/2021 | You et al. |

FOREIGN PATENT DOCUMENTS

| | | | |
|---|---|---|---|
| EP | 3 249 717 A1 | 11/2017 | |
| EP | 3651236 A1 | 5/2020 | |
| EP | 3 709 388 A1 | 9/2020 | |
| EP | 3 748 722 A1 | 12/2020 | |
| GB | 201703244 | 4/2017 | |
| GB | 2560039 A | 8/2018 | |
| JP | 4814405 B2 | 11/2011 | |
| JP | 2018-515903 A | 6/2018 | |
| JP | 2019-091522 A | 6/2019 | |
| KR | 10-2012-0023788 A | 3/2012 | |
| KR | 10-2017-0040638 A | 4/2017 | |
| KR | 10-2018-0053152 A | 5/2018 | |
| KR | 10-2018-0117033 A | 10/2018 | |
| KR | 20180117033 A * | 10/2018 | ........... H01M 50/24 |
| KR | 10-1941686 B1 | 1/2019 | |
| KR | 10-2019-0032887 A | 3/2019 | |
| KR | 10-2019-0042341 A | 4/2019 | |
| KR | 10-2019-0083533 A | 7/2019 | |
| KR | 10-2019-0112470 A | 10/2019 | |
| KR | 10-2019-0122055 A | 10/2019 | |
| KR | 10-2019-0122477 A | 10/2019 | |
| KR | 20190142581 A * | 12/2019 | ........ H01M 10/0422 |
| WO | WO-2011149223 A2 * | 12/2011 | .......... H01M 10/425 |
| WO | 2012/073399 A1 | 6/2012 | |
| WO | WO-2018105883 A2 * | 6/2018 | ........... H01M 50/20 |

OTHER PUBLICATIONS

Machine Translation—WO 2011149223 A2 (Year: 2011).*
Machine Translation—WO 2018105883 A2 (Year: 2018).*
Machine Translation—KR 20190142581 A (Year: 2019).*
Office Action issued Sep. 21, 2023 corresponding Chinese Patent Application No. 202180006165.8 Note: KR 2019-0042341 A, Kr 2017-0040638 A were cited in a prior IDS.
International Search Report (with partial English translation) and Written Opinion issued in corresponding International Patent Application No. PCT/KR2021/000170 dated Apr. 26, 2021.
Office Action issued in corresponding JP Patent Application No. 2022-518805 dated Mar. 20, 2023. Note: KR 10-2019-0042341 cited therein is already of record.
Extended European Search Report issued in corresponding European Patent Application No. 21738174.8 dated May 8, 2023.

* cited by examiner

CONDUCTION PLATE

BATTERY PACK HAVING CONNECTION PLATES, ELECTRONIC DEVICE, AND VEHICLE

TECHNICAL FIELD

The present disclosure relates to a battery pack including a connection plate, and more particularly, to a battery pack having improved weldability between connection plates of a plurality of battery modules.

The present application claims priority to Korean Patent Application No. 10-2020-0002620 filed on Jan. 8, 2020 in the Republic of Korea, the disclosures of which are incorporated herein by reference.

BACKGROUND ART

Secondary batteries are highly applicable to various products and has electrical characteristics with high energy density. The secondary battery is applied not only to portable electronic devices but also to electric vehicles, hybrid electric vehicles, power storage devices, and the like, driven by an electric driving source.

The secondary battery is attracting attention as a new energy source for improving eco-friendliness and energy efficiency since the use of fossil fuels is significantly reduced and no by-product is generated during the use of energy.

A battery pack applied to an electric vehicle has a structure in which a plurality of battery modules, each having a plurality of battery cells that are secondary batteries, are connected to obtain a high output. In addition, each battery cell is an electrode assembly including positive and negative electrode current collectors, a separator, an active material, an electrolyte, and the like to be repeatedly charged and discharged by an electrochemical reaction between the components.

Recently, as the necessity for a large capacity structure increases along with application as an energy storage source, there is an increasing demand for a battery pack having a multi-module structure, in which a plurality of battery modules, each having a plurality of battery cells connected in series and/or in parallel, are aggregated. In this case, a plurality of battery modules are arranged in close contact in a front and rear direction so that a large number of battery modules are accommodated in a limited space inside the battery pack.

In addition, the conventional battery pack includes a plurality of battery modules, and one battery module includes a plurality of battery cells and a housing made of an electrically insulating plastic material to accommodate the battery cells. In addition, the battery pack includes a metal plate as a component for electrically connecting the plurality of battery cells to each other. Also, in order to electrically connect the plurality of battery modules to each other, a plurality of metal plates are joined to each other by welding or the like.

However, while a plurality of metal plates are being welded to each other, if a welding portion of the metal plate is in contact with the housing, the welding heat may not escape from the portion in contact with the housing due to the housing with low thermal conductivity, so a perforation (hole) is generated in the welding portion. For this reason, there is a problem that welding defects frequently occur in the metal plate, and the welding efficiency is greatly reduced.

DISCLOSURE

Technical Problem

The present disclosure is designed to solve the problems of the related art, and therefore the present disclosure is directed to providing a battery pack, which has improved weldability between connection plates of a plurality of battery modules.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack, comprising:
  a plurality of battery modules arranged in a front and rear direction,
  wherein each of the plurality of battery modules includes:
  a plurality of secondary batteries arranged in a horizontal direction and having electrode terminals formed at an upper portion and a lower portion thereof, respectively;
  a connection plate having a body portion located at the upper portion or the lower portion of the plurality of secondary batteries and provided with a plurality of connection terminals respectively in electrical contact and connection with the electrode terminal formed at one of the plurality of secondary batteries, and a connection portion configured to protrusively extend in a left direction or a right direction from the body portion so that a part of the protrusively extending portion is bent upward or downward from the body portion and the bent end is bonded to a portion of the other connection plate; and
  a module housing having a plurality of hollows in which the plurality of secondary batteries are inserted and accommodated, the module housing having a separating groove formed at an outer wall thereof by indenting a portion of the outer wall inward so as to be spaced apart from the bent end of the connection portion at a predetermined interval.

Also, the module housing may include a protrusion configured to support at least a part of a region of the connection portion other than a region bonded to the other connection plate outward so that the region of the connection portion bonded to the other connection plate is spaced apart from the outer wall by a predetermined distance.

Moreover, the connection portion may have an overlapped region formed by folding the bent end upward or downward, and
  the overlapped region of the connection portion may be bonded to a portion of the other connection plate.

In addition, the protrusion may have a fixing groove formed to be recessed inward so that an end of the overlapped region of the connection portion, or the end of the overlapped region and an end of the other connection plate, is inserted and fixed therein.

Further, the overlapped region may have an uneven structure formed to protrude in a left and right direction.

Also, the module housing may include a conduction plate having a metal material and located to face a region of the connection portion, which is bonded to the other connection plate, so that at least a part of the conduction plate is inserted into and fixed to the outer wall.

Moreover, the connection plate may include a first connection plate and a second connection plate, the first connection plate may have a first body portion located at an upper portion of the plurality of secondary batteries and a first connection portion protrusively extending from the first body portion and bent downward, the second connection plate may have a second body portion located at a lower portion of the plurality of secondary batteries and a second connection portion protrusively extending from the second body portion and bent upward, a bent end of the first connection portion of the first connection plate may be bonded to the second connection portion of the second connection plate provided to another battery module, and at least one of the first connection portion and the second connection portion may have an expansion structure protrusively extending forward further to a foremost terminal of the module housing or protrusively extending rearward further to a rearmost terminal of the module housing.

Also, the first connection portion of the first connection plate may be located to overlap with an outer side of the second connection portion of the second connection plate, and the first connection plate may have a conduction portion configured to extend from the first connection portion and bent to surround a part of an inner side of the second connection portion of the second connection plate.

Moreover, the first connection portion of the first connection plate may be located to overlap with an outer side of the second connection portion of the second connection plate, and the second connection plate may have a cover portion configured to extend from the second connection portion and bent to surround a part of an outer side of the first connection portion of the first connection plate.

In addition, in another aspect of the present disclosure, there is also provided an electronic device comprising the battery pack according to the present disclosure.

Further, in another aspect of the present disclosure, there is also provided a vehicle comprising the battery pack according to the present disclosure.

Advantageous Effects

According to an embodiment of the present disclosure, since the separating groove is formed by indenting a portion of the outer wall inward so that the outer wall of the module housing is spaced apart from the bent end of the connection portion at a predetermined interval, it is possible to solve the problem of the prior art where a welding heat is easily accumulated between the connection plate and the module housing during the welding process since a portion of the outer wall of the module housing is in close contact with the connection plate, the welding portion is not uniformly bonded due to uneven temperature distribution of the heated area, and welding defects are likely to occur, such as a perforation (hole) generated in a part thereof.

In other words, since the separating groove of the present disclosure may secure a predetermined space between the bonded portion of the connection plate and the outer wall of the module housing, the welding heat generated during welding between the connection plates may not be accumulated but effectively discharged to the outside.

Also, according to an embodiment of the present disclosure, since the connection portion of at least one of the first connection plate and the second connection plate has the expansion structure protrusively extending forward further to the foremost terminal of the module housing or protrusively extending rearward further to the rearmost terminal of the module housing, one connection plate may be in contact with the other connection plate without a separate connection member. Accordingly, the manufacturing cost of the battery pack may be reduced and the manufacturing process may be simplified.

Moreover, according to an embodiment of the present disclosure, since the module housing of the present disclosure has the protrusion configured to support at least a part of a region of the connection portion other than the bonded region outward so that the region of the connection portion bonded to the other connection plate is separated by a predetermined distance from the outer wall, the connection portion of the connection plate may maintain the separation distance not to come into close contact with the outer wall of the module housing during welding. Moreover, since the connection plate may be placed at the step of the protrusion not to move, welding may be performed stably, thereby increasing weldability.

In addition, according to an embodiment of the present disclosure, since the connection portion has the overlapped region formed by folding the bent end upward or downward and the overlapped region of the connection portion is bonded with a portion of the other connection plate, the welding heat may be conducted and discharged to the outside through the overlapped region of the connection portion. In the prior art, since a welding heat is easily accumulated between the connection plate and the module housing during the welding process, the welding portion is not uniformly bonded due to uneven temperature distribution of the heated area, and welding defects are likely to occur, such as a perforation generated in a part thereof. However, the present disclosure may solve the problems of the prior art. In other words, in the present disclosure, since the overlapped region of the connection portion may secure a predetermined space between the bonded portion of the connection plate and the outer wall of the module housing, the welding heat generated during welding between the connection plates may not be accumulated but effectively discharged to the outside.

Further, according to an embodiment of the present disclosure, since the connection plate of the present disclosure has the uneven structure protruding in the left and right direction in the overlapped region, the uneven structure formed in the overlapped region may form a space between the module housing and the connection plate, so that welding heat may be discharged more quickly, compared to the case where the uneven structure is not formed. Accordingly, weldability may be more excellent.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
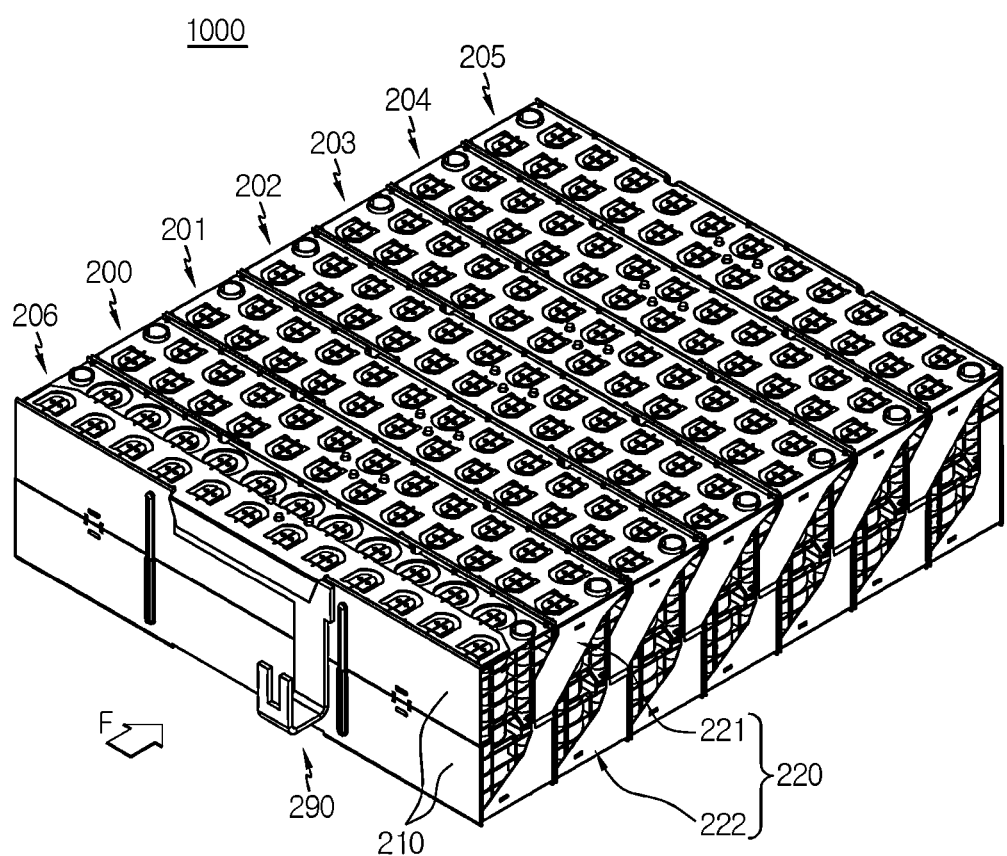
FIG. 1 is a perspective view schematically showing a battery pack according to an embodiment of the present disclosure.
Figure 2:
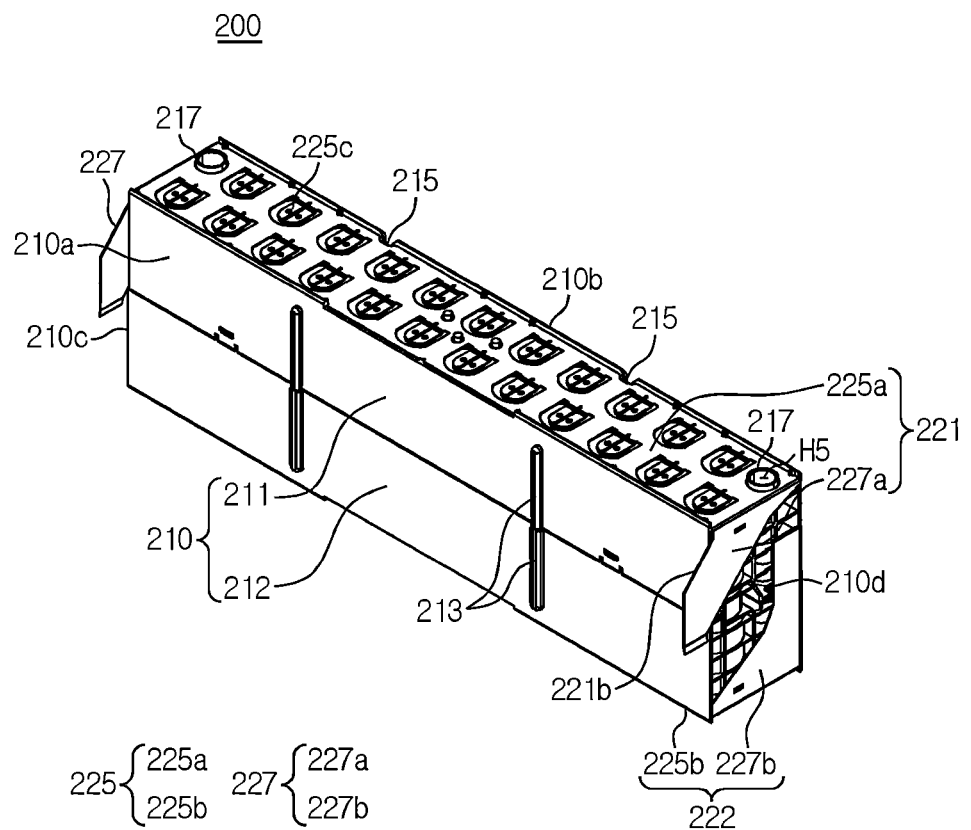
FIG. 2 is a perspective front view schematically showing a battery module, employed at the battery pack according to an embodiment of the present disclosure.
Figure 3:
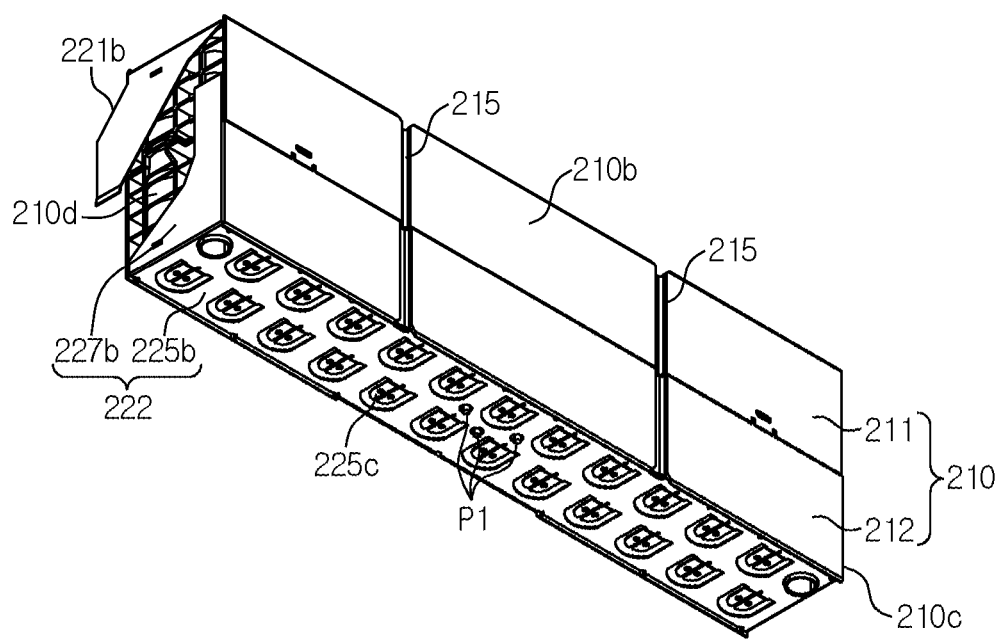
FIG. 3 is a perspective rear view schematically showing the battery module, employed at the battery pack according to an embodiment of the present disclosure.
Figure 4:
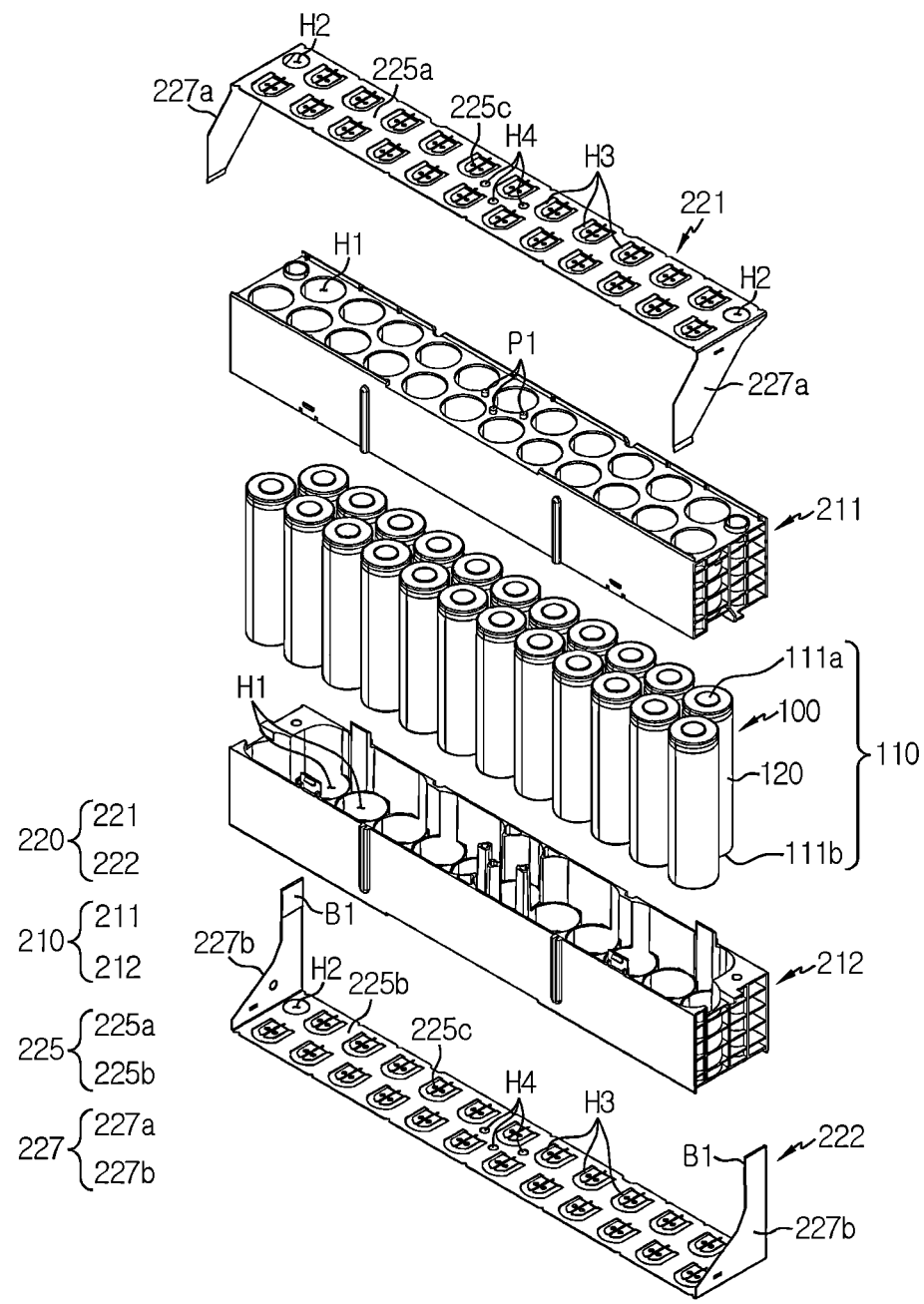
FIG. 4 is an exploded perspective view showing components of the battery module, employed at the battery pack according to an embodiment of the present disclosure.

FIG. 1 is a perspective view schematically showing a battery pack according to an embodiment of the present disclosure. FIG. 2 is a perspective front view schematically showing a battery module, employed at the battery pack according to an embodiment of the present disclosure. FIG. 3 is a perspective rear view schematically showing the battery module, employed at the battery pack according to an embodiment of the present disclosure. Also, FIG. 4 is an exploded perspective view showing components of the battery module, employed at the battery pack according to an embodiment of the present disclosure.

Referring to FIGS. 1 to 4, a battery pack 1000 according to the present disclosure includes a plurality of battery modules 200, 201, 202, 203, 204, 205, 206 arranged in the front and rear direction.

Specifically, the battery module 200 may include a plurality of secondary batteries 100, a module housing 210, and a connection plate 220.

Here, the secondary battery 100 may be a cylindrical battery cell. Specifically, the secondary battery 100 may include a cylindrical battery can 120 and an electrode assembly (not shown) accommodated in the battery can 120.

Also, the secondary battery 100 may be configured such that the battery can 120 stands up in the vertical direction. Also, the battery can 120 may include a material with high electrical conductivity. For example, the battery can 120 may include an aluminum or copper.

In addition, electrode terminals 111a, 111b may be formed at an upper portion and a lower portion of the battery can 120, respectively. Specifically, a first electrode terminal 111a may be formed at a flat circular upper surface of the upper end of the battery can 120, and a second electrode terminal 111b may be formed at a flat circular bottom of the lower end of the battery can 120.

Also, an electrical insulation member may be coated on a side portion of the battery can 120. That is, since the battery can 120 is electrically connected to the electrodes of the electrode assembly therein, for example, an insulating film (not shown) may be coated to surround the side portion of the battery can 120 in order to prevent an unintended conductive object from contacting the battery can 120 and causing electricity leakage.

In addition, the electrode assembly (not shown) may be wound in a jelly-roll form in a state where a separator is interposed between a positive electrode and a negative electrode. A positive electrode tab may be attached to the positive electrode (not shown) and connected to the first electrode terminal 111a at the upper end of the battery can 120. A negative electrode tab may be attached to the negative electrode (not shown) and connected to the second electrode terminal 111b at the lower end of the battery can 120.

Further, when viewed in the F direction, the plurality of secondary batteries 100 may be arranged in the horizontal direction to stand up in the vertical direction inside the module housing 210.

For example, as shown in FIG. 4, one battery module 200 includes 23 secondary batteries 100. The 23 secondary batteries 100 may be arranged to be adjacent to each other in the horizontal direction in a state of standing up in the vertical direction. Further, the positive electrode of the secondary battery 100 may be formed at the upper end thereof, and the negative electrode may be formed at the lower end thereof.

Here, the terms indicating directions such as front, rear, left, right, upper and lower, used in this specification, may vary depending on the position of an observer or the shape of an object. However, in this specification, for convenience of description, the front, rear, left, right, upper and lower directions are distinguished based on the case where viewed in the F direction.

Here, the module housing 210 may be formed to have an inner space in which the plurality of secondary batteries 100 are inserted and accommodated. Specifically, the module housing 210 may have a plurality of hollows H1 formed to surround the outer surface of the secondary battery 100. Further, the module housing 210 may include left and right outer walls 210c, 210d and front and rear outer walls 210a, 210b.

In addition, the module housing 210 may include an upper case 211 and a lower case 212.

Here, in the upper case 211 may have a hollow H1 formed to surround the outer surface of the upper portion of the secondary battery 100. Further, the lower case 212 may be fastened to the lower portion of the upper case 211 and have a hollow H1 formed to surround the outer surface of the lower portion of the secondary battery 100.

In addition, a coupling protrusion 213 may be formed on the front outer wall 210a of the module housing 210 to protrusively extend from the outer surface of the outer wall 210a. Also, a guide groove 215 dented inward from the outer surface of the outer wall 210b may be formed at the rear outer wall 210b of the module housing 210 so that the coupling protrusion 213 is inserted therein.

For example, as shown in FIG. 2, two coupling protrusions 213 may be formed on the front outer wall 210a of the module housing 210. In addition, as shown in FIG. 3, two guide grooves 215 may be formed at the rear outer wall 210b of the module housing 210.

Thus, according to this configuration of the present disclosure, since the coupling protrusion 213 of the module housing 210 of the present disclosure may be inserted into the guide groove 215 of another battery module 200 to guide the arrangement of the plurality of battery modules 200, the battery modules 200 may not only be arranged easily and but also be fixed to each other without being easily separated.

In addition, the connection plate 220 may include a body portion 225 and a connection portion 227. Specifically, the body portion 225 may be located at an upper portion or a lower portion of the plurality of secondary batteries. That is, the body portion 225 may be mounted to the upper portion or the lower portion of the module housing 210. In this case, a guide protrusion P1 protruding upward or downward may be formed at the upper portion or the lower portion of the module housing 210 to guide a location at which the body portion 225 of the connection plate 220 is mounted. In addition, the connection plate 220 may have a guide hole H4 perforated such that the guide protrusion P1 is inserted therein.

Further, the connection plate 220 may include an electrically conductive material. For example, the electrically conductive material may be a metal alloy mainly including copper, nickel, aluminum, gold, silver, or the like.

For example, as shown in FIG. 4, the battery module 200 may have two connection plates 221, 222 respectively located at the upper portion and the lower portion of the plurality of secondary batteries 100. In addition, three guide holes H4 may be formed in the connection plate 221 mounted to the upper portion of the module housing 210, and three guide protrusions P1 may be formed on the upper portion of the module housing 210. Further, three guide holes H4 may be formed in the connection plate 222 mounted to the lower portion of the module housing 210, and three guide protrusions P1 may be formed on the lower portion of the module housing 210.

Further, the body portion 225 may include a plurality of connection terminals 225c provided in a partial region thereof to be in electrical contact and connection with the electrode terminals 111 of the plurality of secondary batteries 100. Specifically, at least one connection opening H3 perforated in a vertical direction may be formed in the body portion 225. Also, the connection terminal 225c of the connection plate 220 may be formed to protrusively extend in a horizontal direction from an inner side of the edge of the connection opening H3 to be in electrical contact and connection with the electrode terminals 111 formed at the plurality of secondary batteries 100. Moreover, the protrusively extending end of the connection terminal 225c may have a branched structure that is split into two sides with respect to the protrusively extending direction.

For example, as shown in FIG. 4, 23 connection openings H3 may be formed in each of the two connection plates 221, 222. In addition, 23 connection terminals 225c may be respectively formed at the 23 connection openings H3 to protrusively extend horizontally from the inner side of the edge thereof. Further, the connection terminal 225c may have a branched structure that is split into two sides with respect to the protrusively extending direction.

Meanwhile, the connection portion 227 may be formed to protrusively extend in a left direction or a right direction from the body portion 225. Also, the protrusively extending portion of the connection portion 227 may be bent upward or downward from the body portion 225. In addition, the bent end of the connection portion 227 may be in contact and connection with a portion of the other connection plate 220.

For example, as shown in FIGS. 1 to 4, two connection portions 227 bent and extending downward from left and right ends of the body portion 225 may be formed at the connection plate 221 mounted to the upper portion of the module housing 210. Also, the bent end of the connection portion 227 may be in contact and connection with a portion of the connection plate 222 of another battery module 206.

Further, two connection portions 227 bent and extending upward from the left and right ends of the body portion 225 may be formed at the connection plate 222 mounted to the lower portion of the module housing 210. In addition, the bent end of the connection portion 227 may be bonded and connected to a portion of the other connection plate 220.

Thus, according to this configuration of the present disclosure, since there is provided the connection plate 220 having the body portion 225 mounted to the upper portion or the lower portion of the module housing 210 and the connection portion 227 extending in the left and right direction of the body portion 225 and bent upward or downward, unlike from the conventional battery pack, the connection plates 221, 222 may be in contact and connection with each other in the left and right direction of the module housing 210. Accordingly, in the present disclosure, it is not necessary to secure a space in the front and rear direction for allowing the connection plates 221, 222 to contact and connect each other inside the module housing 210, thereby implementing the battery module 200 with a slimmer design in the front and rear direction. Ultimately, the energy density of the battery pack 1000 may be maximized.

Figure 5:
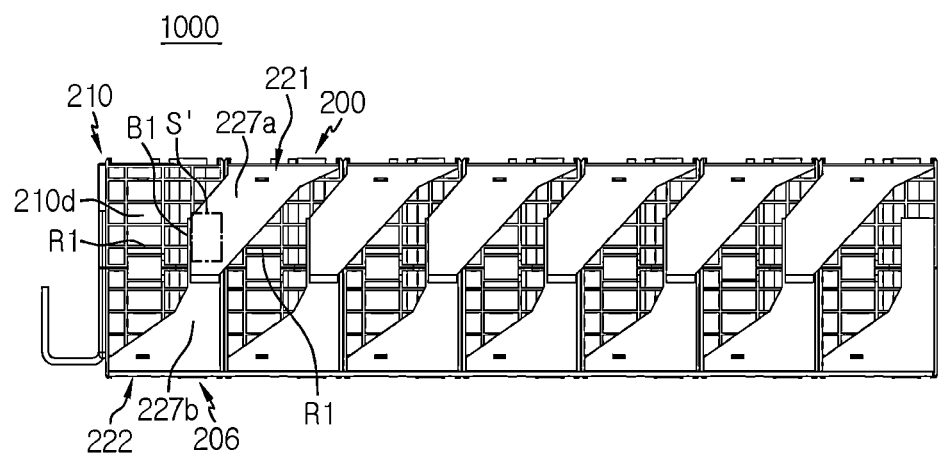
FIG. 5 is a side view schematically showing the battery pack according to an embodiment of the present disclosure.

FIG. 5 is a side view schematically showing the battery pack according to an embodiment of the present disclosure. Also, FIG. 6 is a partial perspective view schematically showing some battery modules, employed at the battery pack according to an embodiment of the present disclosure.

Figure 6:
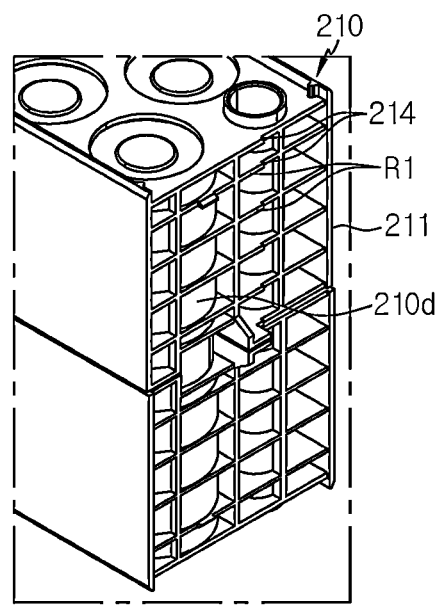
FIG. 6 is a partial perspective view schematically showing some battery modules, employed at the battery pack according to an embodiment of the present disclosure.

Referring to FIGS. 5 and 6 along with FIGS. 2 and 3, a rib R1 may be formed at the outer wall 210d of the module housing 210 to protrude horizontally from an outer side thereof. Specifically, the rib R1 may be formed on the left and right outer walls 210c and 210d of the module housing 210, respectively. In addition, the rib R1 may have a structure extending in the vertical direction and a structure extending in the front and rear direction. The rib R1 may be shaped to extend outward from the outer wall 210d of the module housing 210 with respect to the center in which the secondary battery 100 is accommodated.

In addition, the module housing 210 may have a separating groove 214 formed by indenting a portion of the outer wall 210d inward. Specifically, the separating groove 214 may be formed by indenting a portion of the outer wall 210d so that the bent end of the connection portion 227b is spaced apart from the outer wall 210d at a predetermined interval. Here, the predetermined interval may be an interval spaced apart so that no perforation is generated in the connection portion 227b during the heating process, when the connection portion 227b of the connection plate 222 is welded to a portion 227a of the other connection plate 221. That is, the distance formed by the separating groove 214 between the connection portion 227b and the outer wall 210d means a distance that may secure an empty space enough for the welding heat to effectively escape to the outside.

Moreover, the separating groove 214 may have a size corresponding to or slightly larger than a bonding part of the connection portion 227b of the connection plate 222. For example, as shown in FIG. 5, the connection portion 227b of the connection plate may have a bonded region S' bonded to the connection portion 227a of the other connection plate 221.

In addition, referring to FIGS. 2 and 6, the separating groove 214 may have a size corresponding to the bonded region S' in each of the left and right outer walls 210c, 210d of the module housing 210. The separating groove 214 may be formed by indenting a portion of the rib R1 formed at each of the left and right outer walls 210c, 210d of the module housing 210 inward.

Therefore, according to this configuration of the present disclosure, in the present disclosure, since the separating groove 214 is formed by indenting a portion of the outer wall 210d inward so that the outer wall of the module housing 210 is spaced apart from the bent end of the connection portion 227b at a predetermined interval, it is possible to solve the problem of the prior art where a welding heat is easily accumulated between the connection plate and the module housing during the welding process since a portion (for example, a rib) of the outer wall of the module housing is in close contact with the connection plate, the welding portion is not uniformly bonded due to uneven temperature distribution of the heated area, and welding defects are likely to occur, such as a perforation (hole) generated in a part thereof. In other words, since the separating groove 214 of the present disclosure may secure a predetermined space between the bonded portion of the connection plate 220 and the outer wall of the module housing 210, the welding heat generated during welding between the connection plates 221, 222 may not be accumulated but effectively discharged to the outside.

Referring to FIGS. 1 to 4 again, the connection plate 220 may include a first connection plate 221 and a second connection plate 222.

Specifically, in the first connection plate 221, the first body portion 225a may be located at the upper portion of the plurality of secondary batteries 100. Also, the first connection portion 227a protrusively extending from the first body portion 225a may be bent downward. For example, the first connection plate 221 may be electrically connected (bonded) with the electrode terminals 111a located at the upper portion of the plurality of secondary batteries 100. Moreover, the first connection portion 227a of the first connection plate 221 may be in electrical access (bond) with the second connection portion 227b of the second connection plate 222 provided to another battery module 200. In addition, the connection terminal 225c of the first connection plate 221 may be bonded to the first electrode terminal 111a of the plurality of secondary batteries 100 by means of resistance welding.

Further, in the second connection plate 222, the second body portion 225b may be located at the lower portion of the plurality of secondary batteries 100, and the second connection portion 227b protrusively extending from the second body portion 225b may be bent upward. For example, the second connection plate 222 may be in electric access (bond) with the electrode terminal 111b located at the lower portion of the plurality of secondary batteries 100.

Moreover, the second connection portion 227b of the second connection plate 222 may be in electrical contact with the first connection portion 227a of the first connection plate 221 provided to another battery module 200. In addition, the connection terminal 225c of the second connection plate 222 may be bonded to the second electrode terminal 111b of the plurality of secondary batteries 100 by means of resistance welding.

Referring to FIGS. 2 and 3 again, the connection portion 227 of at least one of the first connection plate 221 and the second connection plate 222 may have an expansion structure 221b protrusively extending forward further to a foremost terminal of the module housing 210 to which the connection plate 220 is mounted. However, the present disclosure is not limited thereto, and the connection portion 227 of at least one of the first connection plate 221 and the second connection plate 222 may have an expansion structure protrusively extending rearward further to a rearmost terminal of the module housing 210.

Specifically, the connection portion 227 of the first connection plate 221 may have an expansion structure 221b protrusively extending forward further to the foremost terminal of the module housing 210. Moreover, the connection portion 227 of the second connection plate 222 may have an expansion structure (not shown) protrusively extending rearward further to the rearmost terminal of the module housing 210.

For example, as shown in FIGS. 1 and 2, the battery pack 1000 may include seven battery modules 200. In addition, the battery pack 1000 may include 14 connection plates 220. Also, the first connection portions 227a of six first connection plates 221 provided to each of the seven battery modules 200 may be formed to protrusively extend forward further to the foremost terminal of the module housing 210 so as to be in contact with the second connection portions 227b of the six second connection plates 222.

Thus, according to this configuration of the present disclosure, since the connection portion 227 of at least one of the first connection plate 221 and the second connection plate 222 has the expansion structure 221b protrusively extending forward further to the foremost terminal of the module housing 210 or protrusively extending rearward further to the rearmost terminal of the module housing 210, one connection plate 221 may be in contact with the other connection plate 222 without a separate connection member. Accordingly, the manufacturing cost of the battery pack 1000 may be reduced and the manufacturing process may be simplified.

Also, referring to FIG. 1 again, among the plurality of battery modules 200, 201, 202, 203, 204, 205, 206 included in the battery pack 1000, any one battery module 206 may include an external input/output bus bar 290. Specifically, the external input/output bus bar 290 may be provided to the battery module 206 located at an outermost front side. Further, the external input/output bus bar 290 may be electrically connected to the first connection plate 221 of the battery module 206. In addition, the external input/output bus bar 290 may be bent forward, and then its bent end may be bent again upward.

Meanwhile, referring to FIG. 2 again, the module housing 210 may include a fixing tube 217 having a hollow structure H5 penetrated in the vertical direction. Specifically, the fixing tube 217 may be located at left and right outer sides, respectively. For example, as shown in FIG. 2, the fixing tube 217 may be located at a left rear end of the module housing 210. Also, another fixing tube 217 may be located at a right rear end of the module housing 210.

Moreover, the fixing tube 217 may be used to insert a fixing bolt (not shown) for fixing the battery module 200 to a floor or a ceiling at a specific installation location.

Thus, according to this configuration of the present disclosure, since the fixing tube 217 having the hollow structure H5 is provided to the module housing 210, a fixing bolt may be easily inserted and fixed such that the battery pack 1000 including the plurality of battery modules 200 may be stably fixed to an installation site.

Meanwhile, referring to FIGS. 2 and 3 again, the fixing tube 217 may have a vertical terminal protrusively extending in a vertical direction to the upper surface or the lower surface of the module housing 210, respectively.

In addition, a guide holes H2 perforated in a vertical direction may be formed in the body portion 225 so that the terminal of the fixing tube 217 protruding in a vertical direction is inserted therein.

Specifically, the terminal of the fixing tube 217 protruding upward may have a structure protruding upward further to the upper surface of the module housing 210. Further, the terminal of the fixing tube 217 protruding downward may have a structure protruding downward further to the lower surface of the module housing 210.

For example, as further shown in FIG. 4, two guide holes H2 may be formed in the body portion 225 of the first connection plate 221. Accordingly, as shown in FIG. 2, the terminal of the fixing tube 217 protruding upward may be inserted into each of the two guide holes H2. Moreover, for example, as further shown in FIG. 4, two guide holes H2 may be formed in the body portion 225 of the second connection plate 222. Accordingly, as shown in FIG. 3, the terminal of the fixing tube 217 protruding downward may be inserted into each of the two guide holes H2.

Thus, according to this configuration of the present disclosure, since the guide hole H2 perforated in the vertical direction is formed at the body portion 225 so that the terminal of the fixing tube 217 protruding in a vertical direction is inserted therein, the first connection plate 221 and the second connection plate 222 may be guided to be mounted in place at the upper portion or the lower portion of the module housing 210. Accordingly, the connection terminals 225c of the first connection plate 221 and the second connection plate 222 may be disposed at locations corresponding to the electrode terminals 111 of the plurality of secondary batteries 100, thereby increasing the manufacturing efficiency and the product completion more effectively.

Figure 7:
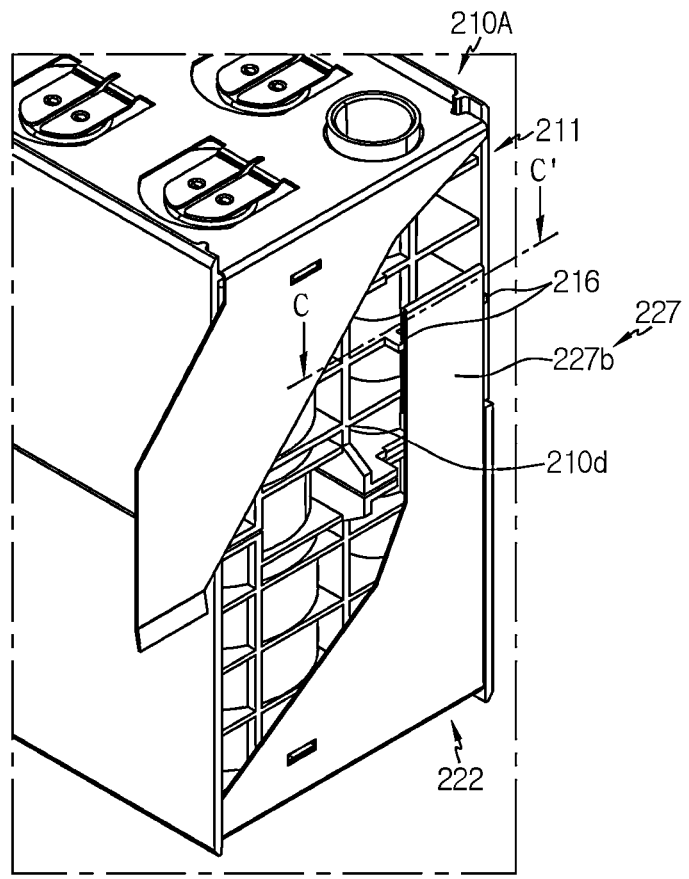
FIG. 7 is a partial perspective view schematically showing some battery modules, employed at the battery pack according to another embodiment of the present disclosure.

FIG. 7 is a partial perspective view schematically showing some battery modules, employed at the battery pack according to another embodiment of the present disclosure. Also, FIG. 8 is a partial sectional view schematically showing the battery pack of FIG. 7, taken along the line C-C'.

Figure 8:
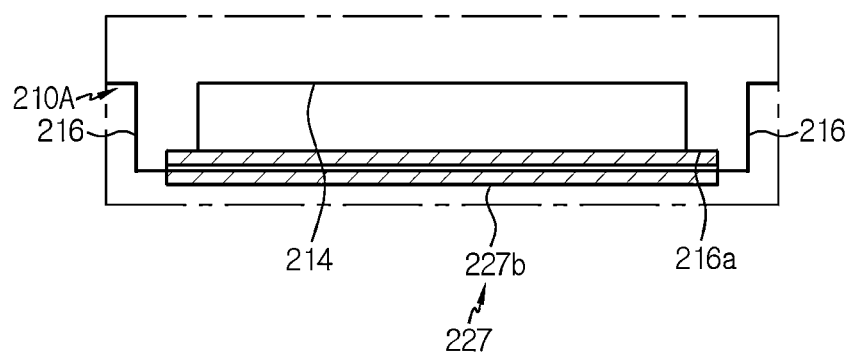
FIG. 8 is a partial sectional view schematically showing the battery pack of FIG. 7, taken along the line C-C'.

Referring to FIGS. 7 and 8 along with FIG. 5, the module housing 210A of the battery module according to another embodiment may further include a protrusion 216, when compared to the module housing 210 of the battery module of FIG. 6. Other components are substantially identical to those of the battery module 200 of FIG. 6.

Specifically, the protrusion 216 may be configured such that the connection portion 227 is spaced apart from the outer wall 210d of the module housing 210A by a predetermined distance. The protrusion 216 may be configured to support at least a part of a region of the connection portion 227, other than the bonded region bonded to the connection plate 221 mounted on another battery module, outward.

For example, as shown in FIG. 8, two protrusions 216 may have a step where both front and rear ends of the connection portion 227b of the connection plate are placed. The separating groove 214 may be positioned between the two protrusions 216. That is, the protrusion 216 may support the end of the connection portion 227 of the connection plate outward based on to the position of the secondary battery 100 so that the bonded region of the connection portion 227b of the connection plate maintains a distance from the outer wall 210d of the module housing 210A.

Therefore, according to this configuration of the present disclosure, since the module housing 210A of the present disclosure has the protrusion 216 configured to support at least a part of a region of the connection portion 227 other than the bonded region outward so that the region of the connection portion 227 bonded to the other connection plate 221 is separated by a predetermined distance from the outer wall 210d, the connection portion 227 of the connection plate may maintain the separation distance not to come into close contact with the outer wall 210d of the module housing 210A during welding. Moreover, since the connection plate 220 may be placed at the step of the protrusion 216 not to move, welding may be performed stably, thereby increasing weldability.

Figure 14:
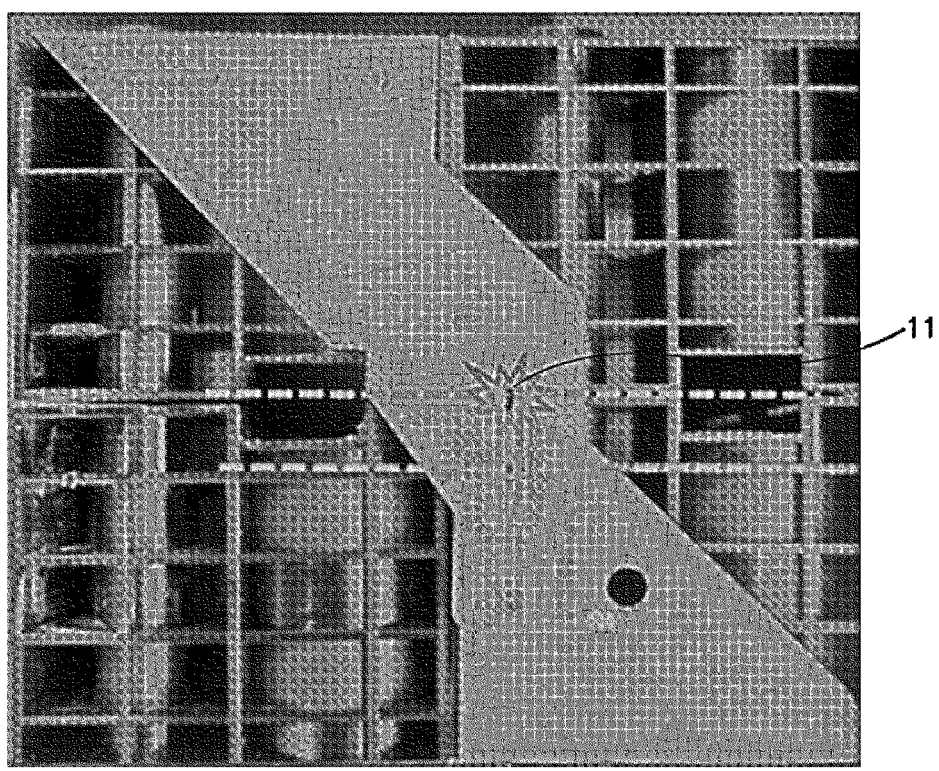
FIG. 14 is a photograph showing experiment results of a welding test for a battery module according to a comparative example of the present disclosure.
Figure 15:
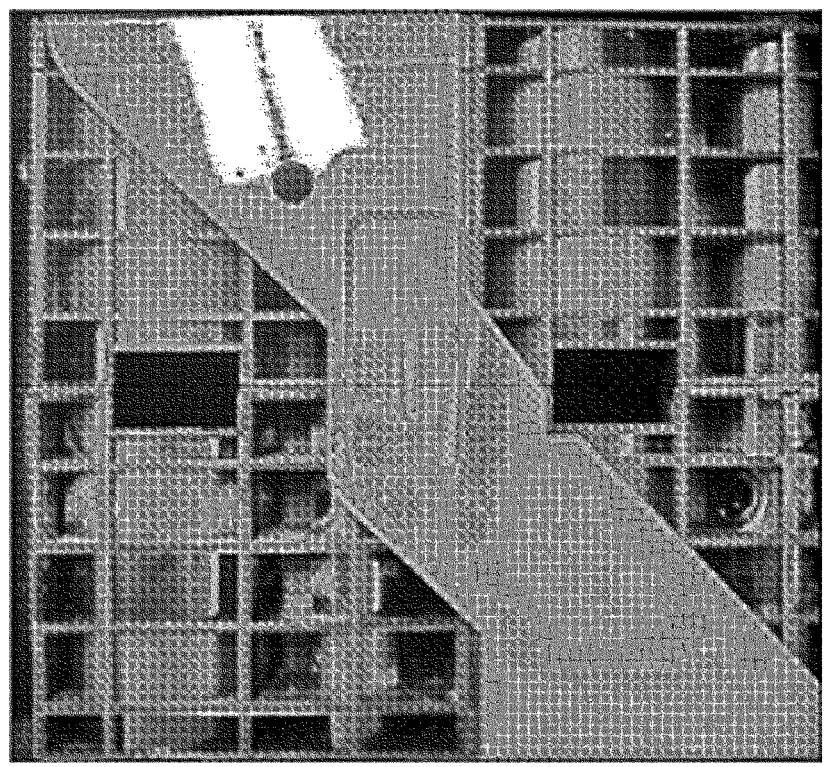
FIG. 15 is a photograph showing experiment results of a welding test for a battery module according to Example 1 of the present disclosure.

In this regard, referring to FIGS. 14 and 15, in the connection plate of a battery module according to a comparative example of FIG. 14, it may be found that after a welding test, a perforation 11 is generated in a region that is in contact with the rib of the module housing in the welding portion. Meanwhile, in the connection plate of the battery module according to Example 1 of FIG. 15, a separating groove is formed so that the welding portion of the connection plate does not come into contact with the rib of the module housing, so a perforation is not generated in the welding portion.

Referring to FIGS. 1, 2, 4 and 5 again, the connection portion 227 may have an overlapped region B1 formed by folding the bent end upward or downward. For example, as shown in FIG. 4, the connection portion 227b of the second connection plate 222 may have an overlapped region B1 formed by folding the bent end downward. Conversely, although not shown, the connection portion 227 of the first connection plate 221 may also have an overlapped region B1 formed by folding the bent end upward.

In addition, the overlapped region B1 of the connection portion 227 may be bonded to a portion of the other connection plate 221. For example, as shown in FIGS. 4 and 5, the overlapped region B1 of the connection portion 227*b* of the second connection plate 222 may be bonded to the connection portion 227*a* of the first connection plate 221.

Therefore, according to this configuration of the present disclosure, since the connection portion 227 has the overlapped region B1 formed by folding the bent end upward or downward and the overlapped region B1 of the connection portion 227 is bonded with a portion of the other connection plate 221, the welding heat may be conducted and discharged to the outside through the overlapped region B1 of the connection portion 227. In the prior art, since a welding heat is easily accumulated between the connection plate and the module housing during the welding process, the welding portion is not uniformly bonded due to uneven temperature distribution of the heated area, and welding defects are likely to occur, such as a perforation (hole) generated in a part thereof. However, the present disclosure may solve the problems of the prior art. In other words, in the present disclosure, since the overlapped region B1 of the connection portion 227 may secure a predetermined space between the bonded portion of the connection plate 220 and the outer wall of the module housing 210, the welding heat generated during welding between the connection plates 221, 222 may not be accumulated but effectively discharged to the outside.

Figure 9:
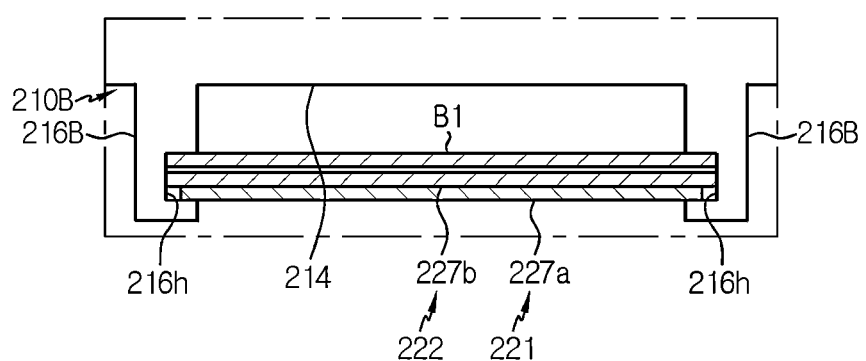
FIG. 9 is a partial sectional view schematically showing a battery pack according to still another embodiment of the present disclosure, taken along a horizontal direction.

FIG. 9 is a partial sectional view schematically showing a battery pack according to still another embodiment of the present disclosure, taken along a horizontal direction.

Referring to FIG. 9 along with FIG. 4, a protrusion 216B provided to a module housing 210B of FIG. 9 has a difference in that a fixing groove 216*h* is formed instead of a step, when compared to the protrusion 216 of the battery module of FIG. 8. The other components of the battery module of FIG. 9 are substantially identical to those of the battery module of FIG. 8.

Specifically, the module housing 210B may have two protrusions 216B. Each of the two protrusions 216B may have a fixing groove 216*h* recessed in the front and rear direction. The fixing groove 216*h* may be configured so that an end of the overlapped region B1 of the connection portion 227 is inserted and fixed therein. Alternatively, the fixing groove 216*h* may be configured so that the end of the overlapped region B1 and an end of the other connection plate 221 are inserted and fixed therein. For example, as shown in FIG. 9, the fixing groove 216*h* formed at each of the two protrusions 216B may be configured so that the end of the overlapped region B1 of the connection portion 227*b* of the second connection plate 222 and the end of the connection portion 227*a* of the first connection plate 221 are inserted and fixed therein.

Therefore, according to this configuration of the present disclosure, since the protrusion 216B has the fixing groove 216*h* recessed so that the end of the overlapped region B1 of the connection portion 227*b*, or the end of the overlapped region B1 and the end of the connection portion 227*a* of the other connection plate 221, is inserted and fixed therein, the separation distance may be maintained so that the connection portion 227*b* of the connection plate 222 does not come into close contact with the outer wall of the module housing 210B during welding. Moreover, since the overlapped region B1 of the connection portion 227*b* of the connection plate 222 and the connection portion 227*a* of the other connection plate 221 are inserted into and fixed to the fixing groove 216*h* of the protrusion 216B, two components may not move in close contact with each other, so welding may be performed stably, thereby increasing weldability further.

Figure 10:
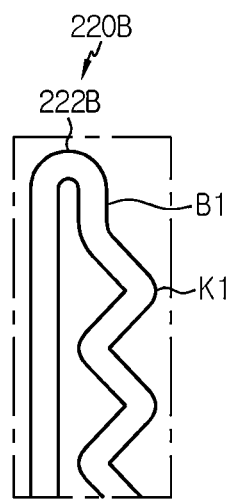
FIG. 10 is a partial side view schematically showing a portion of a connection plate, employed at the battery pack according to still another embodiment of the present disclosure.

FIG. 10 is a partial side view schematically showing a portion of a connection plate, employed at the battery pack according to still another embodiment of the present disclosure.

Referring to FIG. 10 along with FIG. 4, a connection plate 220B of the battery module according to another embodiment may further have an uneven structure K1 protruding in the left and right direction in the overlapped region B1. For example, as shown in FIG. 10, the uneven structure K1 protruding in the left and right direction may be formed in the overlapped region B1 of the second connection plate 222B. The uneven structure K1 may form a separation space between the module housing 210 and the connection plate 220B as much as its protruding size.

Therefore, according to this configuration of the present disclosure, since the connection plate 220B of the present disclosure has the uneven structure K1 protruding in the left and right direction in the overlapped region B1, the uneven structure K1 formed in the overlapped region B1 may form a space between the module housing 210 and the connection plate 220B, so that welding heat may be discharged more quickly, compared to the case where the uneven structure K1 is not formed. Accordingly, weldability may be more excellent.

Figure 11:
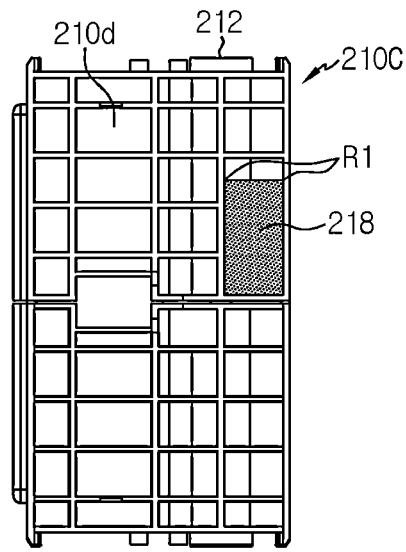
FIG. 11 is a side view schematically showing some battery modules of the battery pack according to still another embodiment of the present disclosure.

FIG. 11 is a side view schematically showing some battery modules of the battery pack according to still another embodiment of the present disclosure.

Referring to FIG. 11 along with FIG. 4, a module housing 210C of a battery module 200C according to another embodiment may further include a conduction plate 218, when compared to the module housing 210 of the battery module 200 of FIG. 4.

Specifically, the conduction plate 218 may be made of a metal material with excellent thermal conductivity. For example, the metal material may be an alloy containing aluminum, copper, nickel, or the like. The conduction plate 218 may be positioned to face a portion of the connection portion 227 of the connection plate 220, which is bonded to the other connection plate 220. The conduction plate 218 may be configured so that at least a part thereof is inserted into and fixed to the outer wall 210*d*. For example, as shown in FIG. 11, the conduction plate 218 may be inserted into and fixed to the right outer wall 210*d* of the module housing 210C. The conduction plate 218 may be inserted and fixed between the ribs R1 formed at the outer wall of the module housing 210C.

Therefore, according to this configuration of the present disclosure, since the module housing 210C is made of a metal material, is positioned to face the portion of the connection portion 227 of the connection plate 220, which is bonded to the other connection plate 220, and includes the conduction plate 218 at least partially inserted into and fixed to the outer wall 210*d*, when the conduction plate 218 is welded between the connection portions 227 of the connection plates 221, 222, the welding heat is quickly conducted to prevent heat from accumulating between the module housing 210C and the connection portions 227 of the connection plate. Accordingly, the present disclosure may solve the problem of the prior art where, since a welding heat is easily accumulated between the connection plate and the module housing during the welding process, the welding portion is not uniformly bonded due to uneven temperature distribution of the heated area, and welding defects are likely to occur, such as a perforation (hole) generated in a part thereof. That is, the weldability may be further increased.

Figure 16:
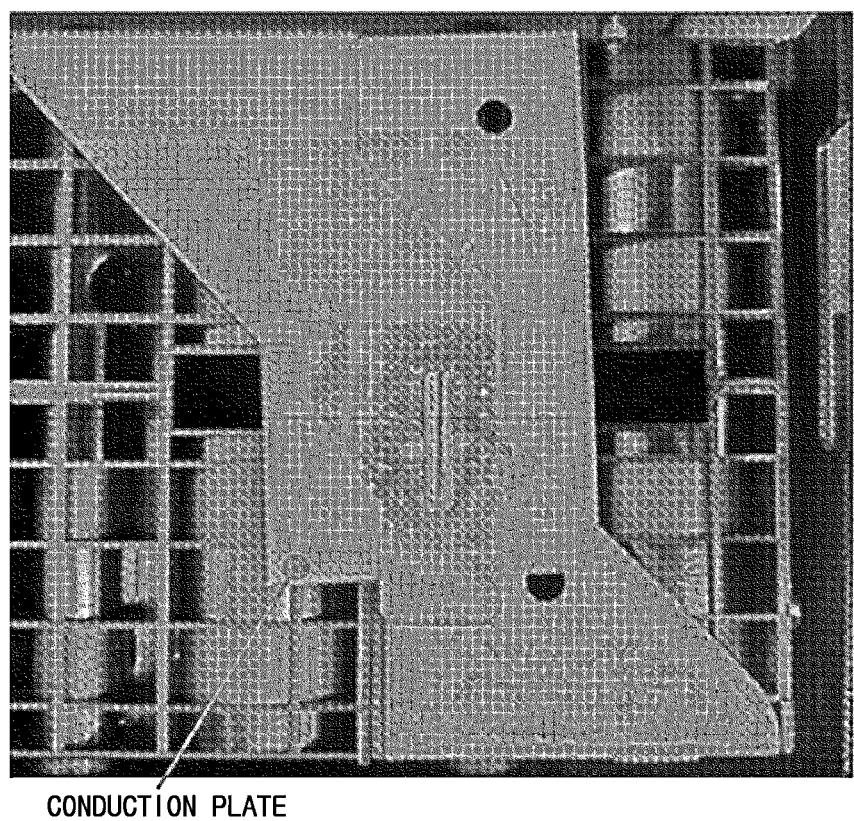
FIG. 16 is a photograph showing experiment results of a welding test for a battery module according to Example 2 of the present disclosure.

In this regard, referring to FIG. 16, in the battery module of Example 2, the conduction plate is located between the outer wall of the module housing and the connection plate. Since the conduction plate may effectively discharge the welding heat to the outside, the heat does not accumulate. Thus, after the welding test, no perforation is formed in the welding portion of the connection plate.

Figure 12:
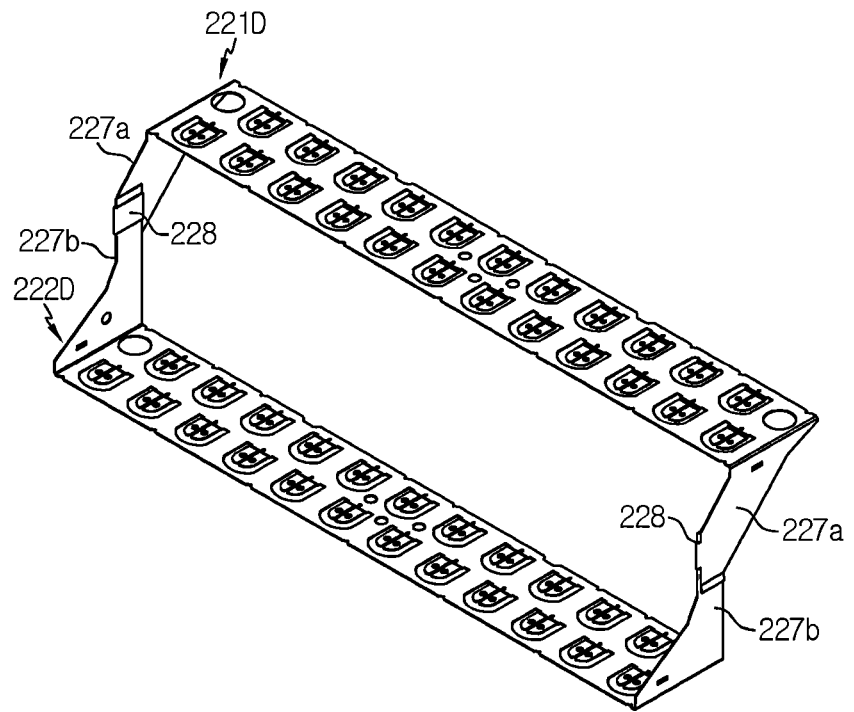
FIG. 12 is a perspective view schematically showing connection plates provided to some battery modules of the battery pack according to still another embodiment of the present disclosure.

FIG. 12 is a perspective view schematically showing connection plates provided to some battery modules of the battery pack according to still another embodiment of the present disclosure.

Referring to FIG. 12 along with FIG. 4, a first connection plate 221D of the battery module according to still another embodiment of the present disclosure may further include a conduction portion 228, when compared to the first connection plate 221 of FIG. 4.

Specifically, the conduction portion 228 may have a structure extending from the first connection portion 227a of the first connection plate 221D and bent to cover a portion of the inner surface of the second connection portion 227b of the second connection plate 222D, which faces the module housing 210. In this case, the first connection plate 221D may be positioned so that the outer side of the first connection portion 227a overlaps with the second connection portion 227b of the second connection plate 222D.

For example, as shown in FIG. 12, the first connection plate 221D may include the conduction portion 228 extending from the first connection portion 227a and bent rearward. At this time, the conduction portion 228 may be configured to surround a part of the inner surface of the second connection portion 227b of the second connection plate 222D.

Therefore, according to this configuration of the present disclosure, since the first connection plate 221D of the present disclosure includes the conduction portion 228 extending from the first connection portion 227a and bent to cover a part of the inner surface of the second connection portion 227b of the second connection plate 222D, the connection portion 227a of the first connection plate 221D, the connection portion 227b of the second connection plate 222D, and the conduction portion 228 may be configured to overlap in three layers.

Accordingly, the conduction portion 228 located at the innermost side may rapidly transfer heat from the welding portion to the outside so that the heat generated in the welding process between the first connection portion 227a and the second connection portion 227b is not accumulated between the module housing 210 and the connection portion 227. Thus, the present disclosure may solve the problem of the prior art where, since a welding heat is easily accumulated between the connection plate and the module housing during the welding process, the welding portion is not uniformly bonded due to uneven temperature distribution of the heated area, and welding defects are likely to occur, such as a perforation (hole) generated in a part thereof. That is, the weldability may be further increased.

Figure 13:
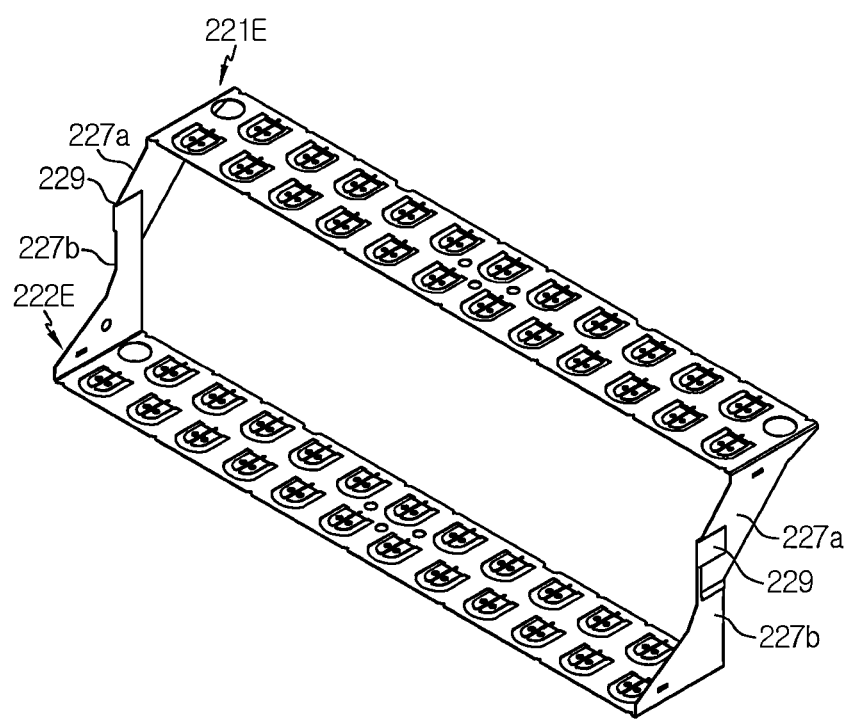
FIG. 13 is a perspective view schematically showing connection plates provided to some battery modules of the battery pack according to still another embodiment of the present disclosure.

FIG. 13 is a perspective view schematically showing connection plates provided to some battery modules of the battery pack according to still another embodiment of the present disclosure.

Referring to FIG. 13 along with FIG. 4, a second connection plate 222E of the battery module according to still another embodiment of the present disclosure may further include a cover portion 229, when compared to the second connection plate 222 of FIG. 4. Specifically, the cover portion 229 may be formed to extend from the second connection portion 227b. The cover portion 229 may have a structure bent to surround a part of the outer side of the first connection portion 227a of the first connection plate 221E. The cover portion 229 may be configured to be bonded to the outer surface of the first connection portion 227a of the first connection plate 221E. In this case, the first connection plate 221E may be positioned so that the first connection portion 227a overlaps with the outer side of the second connection portion 227b of the second connection plate 222E. For example, as shown in FIG. 13, the second connection plate 222E may include the cover portion 229 extending from front and rear ends of the second connection portion 227b. The cover portion 229 may have a structure bent rearward to surround a part of the outer surface of the first connection portion 227a of the first connection plate 221E.

Therefore, according to this configuration of the present disclosure, since the second connection plate 222E of the present disclosure includes the cover portion 229 extending from the second connection portion 227b and bent to cover a part of the outer surface of the first connection portion 227a of the first connection plate 221E, the connection portion 227 of the first connection plate 221E, the second connection plate 222E, and the cover portion 229 may be configured to overlap in three layers. Accordingly, heat generated in the welding process between the first connection portion 227a and the second connection portion 227b is not accumulated between the module housing 210 and the connection portion 227, and the heat may be quickly discharged from the welding portion to the outside. Thus, the present disclosure may solve the problem of the prior art where, since a welding heat is easily accumulated between the connection plate and the module housing during the welding process, the welding portion is not uniformly bonded due to uneven temperature distribution of the heated area, and welding defects are likely to occur, such as a perforation (hole) generated in a part thereof. That is, the weldability may be further increased.

Meanwhile, the battery pack 1000 may include several electrical components (not shown) along with the plurality of battery modules 200, 201, 202, 203, 204, 205, 206. In addition, the electrical components are also referred to as electrical equipment. Representative examples of the electrical equipment included in the battery pack 1000 include a relay, a current sensor, a fuse, a battery management system (BMS), and the like. The electrical equipment is a component for managing charge and discharge of the secondary batteries 100 included in the battery pack 1000 and ensuring safety, and may be regarded as an essential component of most battery packs 1000.

Meanwhile, the present disclosure may provide an electronic device including the battery pack 1000. Specifically, the electronic device may be a large-capacity energy storage device, a cordless vacuum cleaner, a cordless sweeping robot, a cordless lawnmower or the like including at least one battery pack 1000. In addition, the electronic device may have an electronic system for checking or controlling the state of the battery pack 1000.

Meanwhile, the present disclosure may provide a vehicle including the battery pack 1000. Specifically, the vehicle may be an electric vehicle including at least one battery pack 1000. Further, the vehicle may have an electronic system for checking or controlling the state of the battery pack 1000.

Meanwhile, even though the terms indicating directions such as upper, lower, left, right, front and rear directions are used in the specification, it is obvious to those skilled in the art that these merely represent relative locations for convenience in explanation and may vary based on a location of an observer or an object.

| Reference Signs | |
|---|---|
| 1000: battery pack | 100: secondary battery |
| 200, 201, 202, 203, 204, 205, 206: battery module | |
| 111, 111a, 111b: electrode terminal, first electrode terminal, second electrode terminal | |
| 220, 221, 222: connection plate, first connection plate, second connection plate | |
| 225, 225a, 225b: body portion, first body portion, second body portion | |
| 227, 227a, 227b: connection portion, first connection portion, second connection portion | |
| 228: conduction portion | 229: cover portion |
| 210: module housing | 210a, 210b, 210c, 210d: outer wall |
| 221b: expansion structure | R1: rib |
| 214: separating groove | 216: protrusion |
| B1: overlapped region | 216h: fixing groove |
| K1: uneven structure | 218: conduction plate |

What is claimed is:

1. A battery pack, comprising:
a plurality of battery modules arranged in a front and rear direction, wherein each of the plurality of battery modules includes:
  a plurality of secondary batteries arranged in a horizontal direction and having electrode terminals at an upper portion and a lower portion thereof, respectively;
  a connection plate having a body portion at the upper portion or the lower portion of the plurality of secondary batteries and provided with a plurality of connection terminals respectively in electrical contact and connection with the electrode terminal at one of the plurality of secondary batteries, and a connection portion configured to protrusively extend in a left direction or a right direction from the body portion so that a part of the protrusively extending portion is bent upward or downward from the body portion and the bent end overlaps and is bonded to a portion of a connection plate of an adjacent one of the plurality of battery modules to be electrically interconnected; and
  a module housing having a main body, a plurality of hollows defined in the main body in which the plurality of secondary batteries are inserted and accommodated, and a protrusion extending from the main body of a module housing to support the connection portion,
  wherein the protrusion contacts the connection portion at a position of the connection portion spaced apart from a bond region of the connection portion to the connection plate of the adjacent one of the plurality of the battery modules, and the protrusion is absent at a position of the connection portion having the bond region, and
  wherein the protrusion maintains a distance between the main body of the module housing and the connection plate.

2. The battery pack according to claim 1, wherein the connection portion has an overlapped region formed by folding the bent end upward or downward, and
  wherein the overlapped region of the connection portion is bonded to a portion of the other connection plate.

3. The battery pack according to claim 2, wherein the protrusion has a fixing groove recessed inward so that an end of the overlapped region of the connection portion, or the end of the overlapped region and an end of the other connection plate, is inserted and fixed therein.

4. The battery pack according to claim 2, wherein the overlapped region has an uneven structure protruding in a left and right direction.

5. The battery pack according to claim 1, wherein the module housing includes a conduction plate having a metal material and faces a region of the connection portion, which is bonded to the other connection plate, so that at least a part of the conduction plate is inserted into and fixed to an outer wall of the module housing.

6. The battery pack according to claim 1, wherein, in each of the plurality of battery modules, the connection plate includes a first connection plate and a second connection plate,
  wherein, in each of the plurality of battery modules, the first connection plate has a first body portion at an upper portion of the plurality of secondary batteries and a first connection portion protrusively extending from the first body portion and bent downward relative to the first body portion,
  wherein, in each of the plurality of battery modules, the second connection plate has a second body portion at a lower portion of the plurality of secondary batteries and a second connection portion protrusively extending from the second body portion and bent upward relative to the second body portion,
  wherein, in each of the plurality of battery modules, a bent end of the first connection portion of the first connection plate overlaps and is bonded to a second connection portion of a second connection plate of the adjacent one of the plurality of battery modules to be electrically interconnected, and
  wherein, in each of the plurality of battery modules, the first connection portion extends forward further than a front side of the module housing.

7. The battery pack according to claim 6, wherein, in each of the plurality of battery modules, the first connection portion of the first connection plate overlaps an outer side of the second connection portion of the second connection plate, and
  wherein, in each of the plurality of battery modules, the first connection plate has a conduction portion configured to extend from the first connection portion and bent to surround a part of an inner side of the second connection portion of the second connection plate.

8. The battery pack according to claim 6, wherein, in each of the plurality of battery modules, the first connection portion of the first connection plate overlaps an outer side of the second connection portion of the second connection plate, and
  wherein, in each of the plurality of battery modules, the second connection plate has a cover portion configured to extend from the second connection portion and bent to surround a part of an outer side of the first connection portion of the first connection plate.

9. An electronic device, comprising the battery pack according to claim 1.

10. A vehicle, comprising the battery pack according to claim 1.

* * * * *